(12) United States Patent
Roberts, IV et al.

(10) Patent No.: US 9,364,995 B2
(45) Date of Patent: Jun. 14, 2016

(54) THREE-DIMENSIONAL PRINTING AND SCANNING SYSTEM AND METHOD (71) Applicant: Matterrise, Inc., San Francisco, CA (US)

(72) Inventors: Arthur L. Roberts, IV, San Francisco, CA (US); Jerred Kiloh, San Francisco, CA (US)

(*) Notice: Subject to any disclaimer, the term of this patent is extended or adjusted under 35 U.S.C. 154(b) by 0 days.

(21) Appl. No.: 13/844,046

(22) Filed: Mar. 15, 2013

(65) Prior Publication Data
US 2014/0271964 A1    Sep. 18, 2014

(51) Int. Cl.
*B29C 67/00*    (2006.01)

(52) U.S. Cl.
CPC ......... *B29C 67/0088* (2013.01); *B29C 67/0055* (2013.01)

(58) Field of Classification Search
CPC .................. B29C 67/0051; B29C 67/0055
USPC ........................................... 425/375; 264/401
See application file for complete search history.

(56) References Cited

U.S. PATENT DOCUMENTS

| | | | |
|---|---|---|---|
| 5,059,266 A * | 10/1991 | Yamane et al. ................. | 156/64 |
| 5,121,329 A | 6/1992 | Crump | |
| 5,303,141 A | 4/1994 | Batchelder et al. | |
| 6,858,826 B2 | 2/2005 | Mueller et al. | |
| 7,037,382 B2 | 5/2006 | Davidson et al. | |
| 7,141,207 B2 | 11/2006 | Jandeska et al. | |
| 7,291,002 B2 * | 11/2007 | Russell et al. ................. | 425/447 |
| 7,939,003 B2 | 5/2011 | Bonassar et al. | |
| 8,153,183 B2 | 4/2012 | Skubic et al. | |
| 8,155,774 B2 | 4/2012 | Wu et al. | |
| 8,185,229 B2 | 5/2012 | Davidson | |
| 8,243,334 B2 | 8/2012 | Abeloe | |
| 8,262,388 B2 | 9/2012 | Dunne et al. | |
| 8,274,665 B2 | 9/2012 | Silverbrook | |
| 8,282,380 B2 | 10/2012 | Pax et al. | |
| 8,287,112 B2 | 10/2012 | Van Thillo et al. | |
| 8,287,794 B2 | 10/2012 | Pax et al. | |
| 8,300,048 B2 | 10/2012 | Hayashi et al. | |
| 8,337,501 B2 | 12/2012 | Fitz et al. | |
| 2005/0053275 A1 | 3/2005 | Stokes | |

(Continued)

FOREIGN PATENT DOCUMENTS

| | | |
|---|---|---|
| EP | 1705616 | 9/2006 |
| EP | 2067607 | 6/2009 |

(Continued)

*Primary Examiner* — Timothy Kennedy
(74) *Attorney, Agent, or Firm* — Edward J. Baba; Bozicevic, Field & Francis LLP (57) ABSTRACT Disclosed herein are systems and methods for three-dimensional (3D) printing and scanning (or rapid prototyping). For example, presented herein are 3D printing and scanning systems and methods to create a 3D replica of a 3D object on a build surface. Movements and/or controls of the system are generally based on polar coordinates relative to a center of a build surface. System components may generally include: (1) a rotatable build surface; (2) a media extruder positioned over the build surface; (3) a heating element to melt media as it is drawn into the extruder; (4) an extruder positioning system coupled to the extruder and configured to move the extruder over the build surface based on polar coordinates relative to a center of the build surface; and (5) an optical scanning system for scanning of a 3D object to obtain a plurality of two-dimensional (2D) images of the 3D object.

21 Claims, 5 Drawing Sheets

(56) References Cited

U.S. PATENT DOCUMENTS

| | | |
|---|---|---|
| 2009/0303507 A1 | 12/2009 | Abeloe |
| 2012/0165969 A1 | 6/2012 | Elsey |
| 2012/0201960 A1 | 8/2012 | Hartmann et al. |
| 2012/0219698 A1 | 8/2012 | Steingart et al. |
| 2012/0219699 A1 | 8/2012 | Pettersson et al. |
| 2012/0224755 A1 | 9/2012 | Wu |
| 2012/0235329 A1 | 9/2012 | Fowler et al. |
| 2012/0242794 A1 | 9/2012 | Park et al. |
| 2012/0243891 A1 | 9/2012 | Watanabe |
| 2012/0251688 A1 | 10/2012 | Zimmerman et al. |
| 2012/0251689 A1 | 10/2012 | Batchelder |
| 2012/0253185 A1 | 10/2012 | Furuichi |
| 2012/0261848 A1 | 10/2012 | Haraszati |
| 2012/0286453 A1 | 11/2012 | Pettis |
| 2012/0287259 A1 | 11/2012 | Pettis |
| 2012/0287459 A1 | 11/2012 | Pettis |
| 2012/0287472 A1* | 11/2012 | Pettis .......................... 358/1.15 |
| 2012/0287473 A1 | 11/2012 | Pettis |
| 2012/0305003 A1 | 12/2012 | Mark |
| 2012/0308837 A1 | 12/2012 | Schlechtriemen et al. |
| 2012/0316669 A1 | 12/2012 | Kritchman et al. |
| 2013/0002614 A1 | 1/2013 | Nowatzyk et al. |
| 2013/0004610 A1 | 1/2013 | Hartmann et al. |
| 2013/0011562 A1 | 1/2013 | Varanka et al. |
| 2013/0015596 A1 | 1/2013 | Mozeika et al. |
| 2013/0027398 A1 | 1/2013 | Maucec et al. |
| 2013/0189435 A1* | 7/2013 | Mackie et al. ................ 427/256 |

FOREIGN PATENT DOCUMENTS

| | | |
|---|---|---|
| EP | 2314455 | 4/2011 |
| EP | 2447045 | 5/2012 |
| EP | 2447046 | 5/2012 |
| EP | 2455211 | 5/2012 |
| EP | 2508325 | 10/2012 |
| EP | 2514368 | 10/2012 |
| EP | 2555051 | 2/2013 |
| WO | 9937454 | 7/1999 |
| WO | 03021394 | 3/2003 |
| WO | 03026876 | 4/2003 |
| WO | 2007139938 | 12/2007 |
| WO | 2010096572 | 8/2010 |

* cited by examiner

THREE-DIMENSIONAL PRINTING AND SCANNING SYSTEM AND METHOD

SUMMARY

Disclosed herein are systems and methods for three-dimensional (3D) printing and scanning (or rapid prototyping). For example, presented herein are 3D printing and scanning systems and methods to create a 3D replica of a 3D object on a build surface in a single device. Movements and/or controls of the system are generally based on polar coordinates relative to a center of a build surface. System components may generally include: (1) a rotatable build surface; (2) a media extruder positioned over the build surface; (3) a heating element to melt media as it is drawn into the extruder; (4) an extruder positioning system coupled to the extruder and configured to move the extruder over the build surface based on polar coordinates relative to a center of the build surface; and (5) an optical scanning system comprising one or more cameras positioned to obtain a plurality of two-dimensional (2D) images of a 3D object; and/or (7) a microcontroller coupled to the data transmission system and configured to execute control code. In certain embodiments, the system components include an image processor communicably coupled to the microcontroller, wherein the image processor receives the plurality of 2D images, converts the plurality of 2D images into a 3D surface reconstruction of the 3D object, and generates control code based on the 3D surface reconstruction. In other embodiments, the system components may include a data transmission system coupled to the optical scanning device and configured with the ability to send the plurality of 2D images to an external processor to convert the plurality of 2D images into a 3D surface reconstruction of the 3D object

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

DETAILED DESCRIPTION

Three-dimensional (3D) printing (a.k.a. rapid prototyping and/or additive manufacturing) refers to techniques and systems for making 3D solid objects from a digital model. 3D printing uses an additive process of depositing successive layers of media (or melt material) on a build surface until the 3D object is fully reconstructed. Typically, 3D printer and scanners move a printhead (or extruder) over the build surface in X and Y axes, based on Cartesian coordinates. However, 3D printer and scanners with printhead movements based on Cartesian coordinates have inherent limitations. Furthermore, 3D scanning of a 3D object requires the rotation of a 3D object in front of imaging sensors.

In some aspects of the present disclosure, a 3D printer and scanner is provided that enables scanning of a 3D object, and further, enables printing of a 3D object such as a replica of the 3D object that is scanned. In certain embodiments, the 3D printer and scanner includes a rotational build surface, which enables rotation of the 3D object for scanning and printing purposes. Disclosed herein are systems and methods for 3D printing wherein movements and/or controls of the system are generally based on polar coordinates relative to a center of a build surface. System components may generally include: (1) a rotatable build surface; (2) a media extruder positioned over the build surface; (3) a heating element to melt media as it is drawn into the extruder; (4) an extruder positioning system coupled to the extruder and configured to move the extruder over the build surface based on polar coordinates relative to a center of the build surface; and (5) an optical scanning system comprising one or more cameras positioned to obtain a plurality of two-dimensional (2D) images of a 3D object; and/or (7) a microcontroller coupled to the data transmission system and configured to execute control code. In certain embodiments, the system components include an image processor communicably coupled to the microcontroller, wherein the image processor receives the plurality of 2D images, converts the plurality of 2D images into a 3D surface reconstruction of the 3D object, and generates control code based on the 3D surface reconstruction. In other embodiments, the system components may include a data transmission system coupled to the optical scanning device and configured with the ability to send the plurality of 2D images to an external processor to convert the plurality of 2D images into a 3D surface reconstruction of the 3D object The systems and methods presented herein have advantages over prior 3D printing systems in that they: (1) result in simplified and less expensive control systems; (2) can be implemented with DC motors, instead of traditional stepper motors; (3) can be smaller, taking up a smaller machine footprint, than traditional X,Y-based systems; (4) have a build surface to machine footprint ratio of 1:2 or less; (5) are quieter because they don't require the "jerking" around in two dimensions seen in traditional X,Y-based systems; (6) create smoothers curved surfaces, which increase resolution on organic shapes; and/or (7) use the same mechanisms and build surface to perform both scanning and printing operations.

The following detailed description of the figures refers to the accompanying drawings that illustrate exemplary embodiments. Other embodiments are possible. Modifications may be made to the embodiments described herein without departing from the spirit and scope of the present invention. Therefore, the following detailed description is not meant to be limiting.

FIGS. 1, 2, 3A, 3B, 4A, and 4B illustrates various views of a 3D printer and scanner, according to certain embodiments. As the 3D printer and scanners shown are similar and include similar features, the figures are described together. For the sake of clarity and brevity, the common features will not be described in great detail repeatedly, but rather reference to the previous discussion is applicable.

Figure 1:
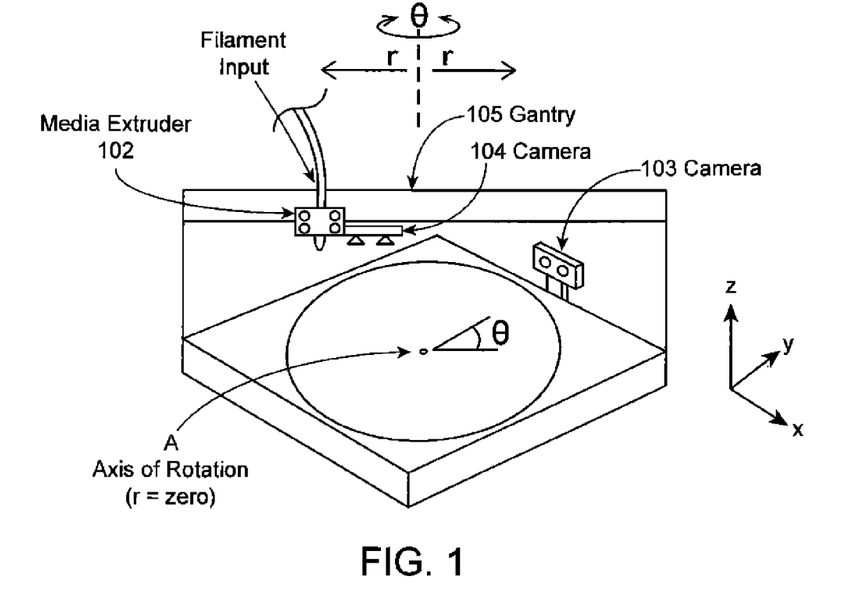
FIG. 1 is a perspective view of a 3D printer and scanner, according to one embodiment.

FIG. 1 is a perspective view of a 3D printer and scanner, according to one embodiment. 3D printer and scanner system 100 includes a rotatable build surface 101, media extruder 102, and horizontal camera 103 and vertical camera 104 which are included as part of an optical scanning system. Reference axes x, y, and z are shown for reference purposes. The rotatable build surface 101 is within the x-y plane and rotates about the z-axis.

The media extruder 102 is positioned over the build surface 101, and moves over the build surface based on polar coordinates relative to a center of the build surface (e.g., the center of rotation of the build surface). The media extruder 102 moves along the reference x-axis shown in the figures, to provide movement in the radial direction (r-direction) from the center axis of rotation, A, of the rotatable build surface 101. The angle of rotation, θ, is shown about the center axis of rotation. In the embodiment shown, the media extruder 102 is coupled to a print gantry 105 that extends in the r-direction. The media extruder 102 and the rotatable build surface 101 also move relative to each other in the z-direction. In one embodiment, the media extruder 102 moves in the z-direction while the rotatable build surface 101 is stationary in the z-direction. In another embodiment, the rotatable build surface 101 moves in the z-direction while the media extruder 102 is stationary in the z-direction. In yet another embodiment, both the rotatable build surface 101 and the media extruder 102 move in the z-direction in conjunction with one another.

The media extruder 102 moves along the print gantry 105 to provide the radial movement, r, from the center of the axis of rotation, A, towards the outer perimeter of the build surface 101. Furthermore, the build surface 101 is rotatable about its center axis, A, at an angle of rotation, θ. Still further, the media extruder 102 and build surface 101 are movable in the z-direction relative to one another. In this way, the media extruder 102 and build surface 101 may be moved or rotated based on polar coordinates—e.g., r, θ, z. With regard to the reference axes shown, both r and θ are in the reference x-y plane.

Having the media extruder only move in the r-direction, and not requiring movement in the y-direction, enables the extruder 102 to be moved less compared to traditional systems where the extruder is moved in the x and y-direction. It should be appreciated that in some embodiments the print gantry 105 may be offset from the radial axis to account for the thickness or width of the extruder to provide the extrusion along the radial axis.

Figure 2:
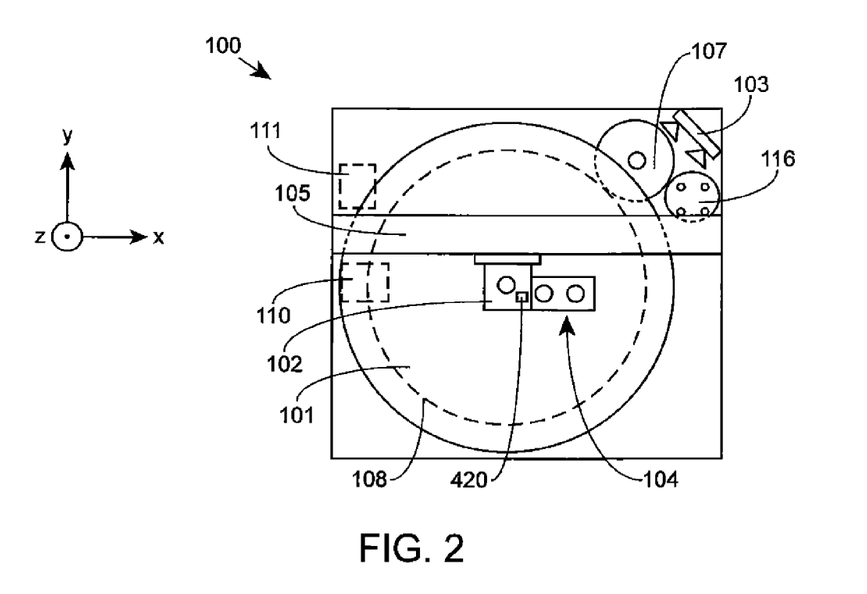
FIG. 2 illustrates a top view of a 3D printer and scanner, according to one embodiment.

FIG. 2 illustrates a top view of a 3D printer and scanner, according to one embodiment. As similarly described above for FIG. 1, 3D printer and scanner 100 is includes a rotatable build surface 101, media extruder 102, print gantry 105, and horizontal camera 103 and vertical camera 104 which are included as part of an optical scanning system. The media extruder 102 moves along the print gantry 105 to provide the radial movement, r, from the center of the axis of rotation A, which is shown as the same as the z-axis.

3D printer and scanner 100 also includes a motor 106 (e.g., a DC motor) that is coupled to the build surface 101 such that actuation of the DC motor 106 rotates the build surface 101. For example, the DC motor 106 may be coupled to one or more gears to provide rotation of the build surface 101. For instance, as shown, the DC motor 106 may be operably coupled to pinion 116 gear 107 and gear 108 which is fixed to the rotatable build surface 101. Upon actuation of the DC motor 106, gears 107 and 108 are rotated to provide rotation of the build surface 101 about the rotation axis A. In one embodiment, the DC motor 106 rotates the build surface 101 in one direction. In another embodiment, the DC motor 106 rotates the build surface 101 in both directions.

3D printer and scanner 100 may also include an extruder positioning system coupled to the media extruder 102 and configured to move the media extruder 102 over the build surface 101 based on polar coordinates relative to a center of the build surface (e.g., the center axis of rotation, A). For example, the extruder positioning system may include the print gantry 105 to guide the media extruder 102 in the r-direction to provide the distance, r, from the center axis of rotation, A. Furthermore, the extruder positioning system may include a motor 110 (e.g., stepper motor), which is operably coupled to the media extruder 102 to provide the radial movement relative to the build surface upon actuation of the stepper motor 110. It should be appreciated that other types of motors may be implemented—e.g., a motor implemented within a linear-actuator to (actuate) the print head along the radial gantry.

Figure 3A:
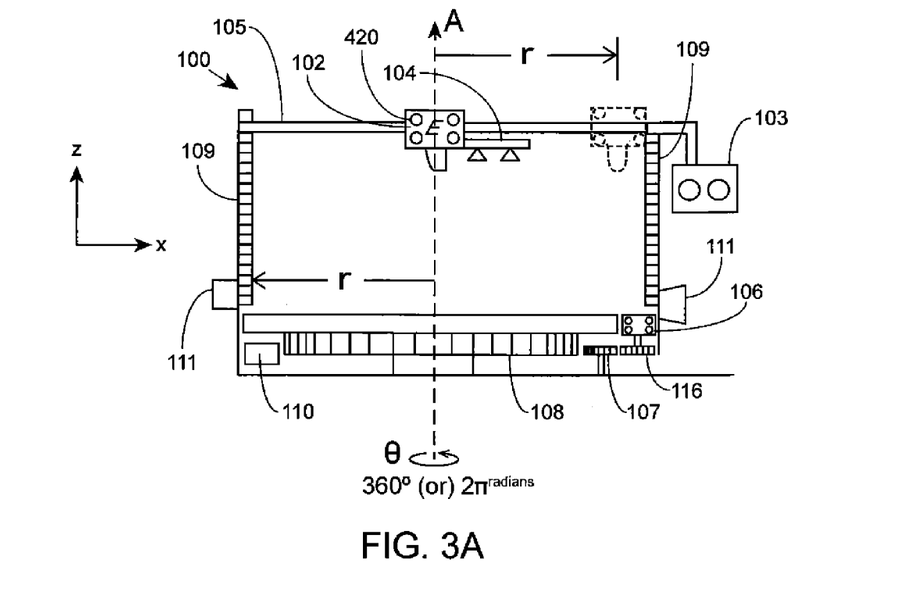
FIG. 3A illustrates a side view of a 3D printer and scanner, according to one embodiment.

The media extruder 102 and the rotatable build surface 101 also move relative to each other in the z-direction. FIG. 3A illustrates a side view of a 3D printer and scanner 100, according to one embodiment. In the embodiment shown, the media extruder 102 moves in the z-direction while the rotatable build surface 101 is stationary in the z-direction. For example, the extruder positioning system may include another motor 111 (e.g., stepper motor) to move the media extruder 102 axially relative to the build surface 101. For instance, the stepper motor 111 may be coupled to a threaded shaft coupled to the print gantry 105. In this way, upon actuation of the stepper motor 111, the media extruder 102 and print gantry 105, move in the vertical z-direction.

Figure 3B:
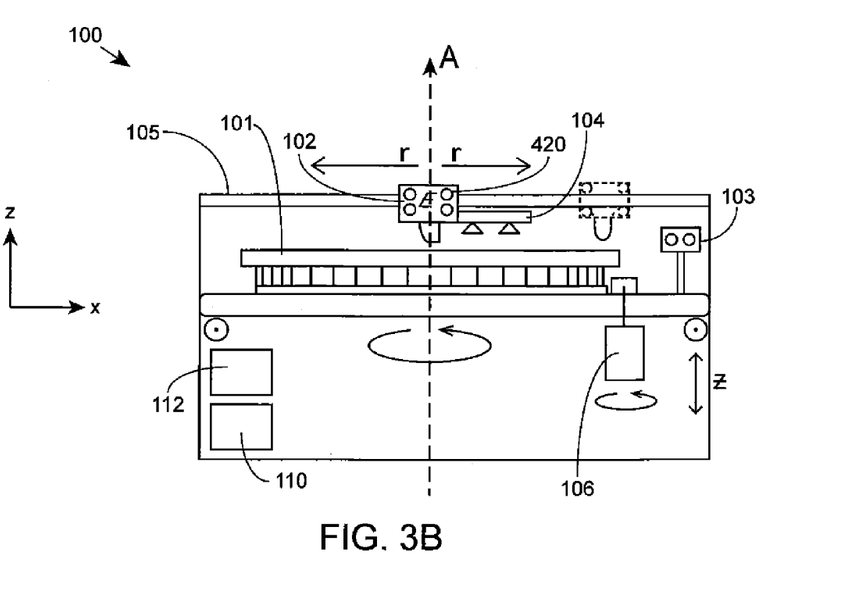
FIG. 3B illustrates a side view of a 3D printer and scanner, according to one embodiment.

FIG. 3B illustrates a side view of a 3D printer and scanner 100, according to yet another embodiment. In the embodiment shown, the rotatable build surface 101 moves in the z-direction while the media extruder 102 is stationary in the z-direction. For example, the 3D printer and scanner 100 may include a stepper motor 112 that is operably coupled to the build surface 101, such that upon actuation of the stepper motor 112, the rotatable build surface 101 moves axially towards the media extruder 102. For example, the stepper motor 112 may be coupled to a threaded shaft coupled to the rotatable build surface 101. In this way, upon actuation of the stepper motor, the stepper motor 112 causes the threaded shaft to rotate and move the build surface 101 in the vertical z-direction towards the media extruder 102 which remains stationary in the z-direction. It should be appreciated that other known translation mechanisms other than a threaded shaft, or its equivalents, may also be implemented in other embodiments.

The media extruder 102 may also include a filament input 430 for receiving a filament that is operably coupled to a motor 420 (e.g., stepper motor) (see, e.g., FIGS. 4A and 4B), which draws the filament into the extruder to the heating element 440 (e.g., heating chamber). The 3D printer and scanner system also include a heating element to melt the filament as it is drawn into the extruder. The stepper motor 420 and heating element 440 are located close to the exit of the extrusion nozzle 450. For example, in one embodiment, the heating element 440 is positioned within 0.5 inches from the exit of the output nozzle. In this way, for instance, the filament is still cool when it enters the extruder and can be gripped by teeth on the stepper motor 420 inside the extruder head, and then forced through a small heating chamber 440 that has a tiny hole (the extruder nozzle) on its exit. The media extruder 102 also include an output nozzle for depositing filament melt onto the build surface 101. The media extruder 102 also includes other components such as a temperature sensor (e.g., thermocouple or thermistor) coupled to the extruder's heating chamber, to monitor the temperature of the melted filament being provided by the extruder 102.

In an alternative embodiment, the 3D printer and scanner includes more than one extruder head on the print gantry. For example, in one embodiment, two extruder heads are operating simultaneously on the print gantry. In some instances, the two extruder heads are operating on opposite sides of the center axis of rotation.

Any variety of materials may be implemented in different embodiments. Example materials may include, but are not limited to, various polymers such as acrylonitrile butadiene styrene (ABS), polycarbonate (PC), nylon, polylactic acid (PLA), PC/ABS, and polyphenylsulfone (PPSU).

The 3D printer and scanner 100 may also include an optical scanning system including a plurality of cameras. For example, as shown, the optical scanning system may include camera 103 and camera 104 that are positioned to obtain a plurality of two-dimensional (2D) images of a 3D object on the rotatable build surface 101. Each of cameras 103 and 104 may include one or more cameras. Therefore, the term "camera 103" and camera 104" are used broadly herein to include one or more cameras. Camera 103 includes two horizontal viewing cameras, while camera 104 includes two vertical viewing cameras. In one embodiment, for example, as shown in FIG. 3A, the vertical viewing camera 104 is coupled to the media extruder 102 such that the vertical viewing camera 104 move with the media extruder 102 in the r-direction. If the media extruder 102 and print gantry 105 also moves in the z-direction, then the vertical viewing camera 104 will also move in the z-direction. The horizontal viewing camera 103 is shown positioned near the perimeter of the build surface 101 to provide 2D images looking sideways toward the rotation axis A.

In one embodiment, the camera 103 is coupled to the build surface 101 and moves in the z-direction when the build surface 101 moves in the z-direction. In another embodiment, the camera 103 is coupled to the print gantry 105 and moves in the z-direction when the print gantry 105 moves in the z-direction.

The horizontal viewing camera 103 and vertical viewing camera 104 may include, for example, photodetectors (e.g., photodiodes or photomultipliers) that receive light and generate 2D image data. Cameras may include, but are not limited to, technologies such as complementary metal-oxide-semiconductor (CMOS) image sensors, charge-coupled device (CCD) image sensors, etc. It should be appreciated that other types of cameras may also be implemented in different embodiments. For instance, the camera may include different resolutions (e.g., VGA resolution). In some instances, the camera may see non-visible light such as infrared light for example. In some instances, the light is structured. In some instances, a camera may include more than one lens, and further, may include different types of lenses, such as a wide-angle lens for example.

The optical scanning system also includes one or more light sources, such as light emitting diodes (LEDs) for instance. For example, the LED's provide light that irradiates the 3D object and is reflected and detected by photodiodes or photomultipliers of the cameras 103 and 104 to provide 2D image data. Different types of light may be implemented in various embodiments—e.g., light, structured light, visible, invisible (e.g., infrared), etc. The light sources may be separate from the cameras 103 and 104 and/or remote from the cameras 103 and 104 (e.g., mounted to the inside of the device pointing toward the rotating build surface and illuminating the 3D object); or may be positioned proximate to the cameras 103 and 104 (e.g., coupled to, or integrated on, the camera).

In one embodiment, the horizontal viewing camera 103 may include two cameras positioned proximate to one another with one or more LEDs positioned between the two cameras illuminating the object being scanned. Similarly, the vertical viewing camera 104 may include two cameras positioned proximate to one another, with one or more LEDs positioned between the two cameras. Example distances between the two cameras on either camera 103 or camera 104 may include, but are not limited to ranges such as 4 inches or less, for instance 2 inches or less, including 1 inch or less. The number of LEDs may vary in different embodiments. Example number of LED's may include, but are not limited to, 10 or less, such as 5 or less, including 2 or less. While each of cameras 103 and 104 are described with two cameras in the figures, it should be appreciated that each of horizontal and vertical viewing cameras may include more than two cameras.

Figure 4A:
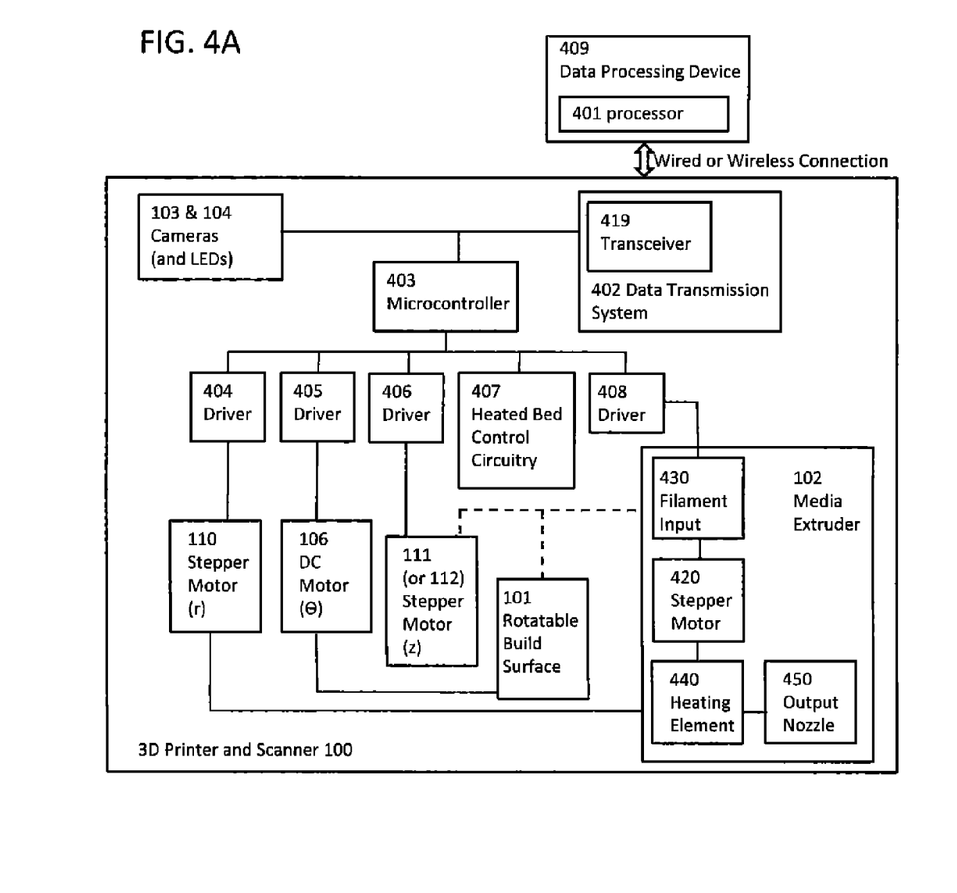
FIG. 4A illustrates a system block diagram for a 3D printer and scanner and external processing device, according to one embodiment.
Figure 4B:
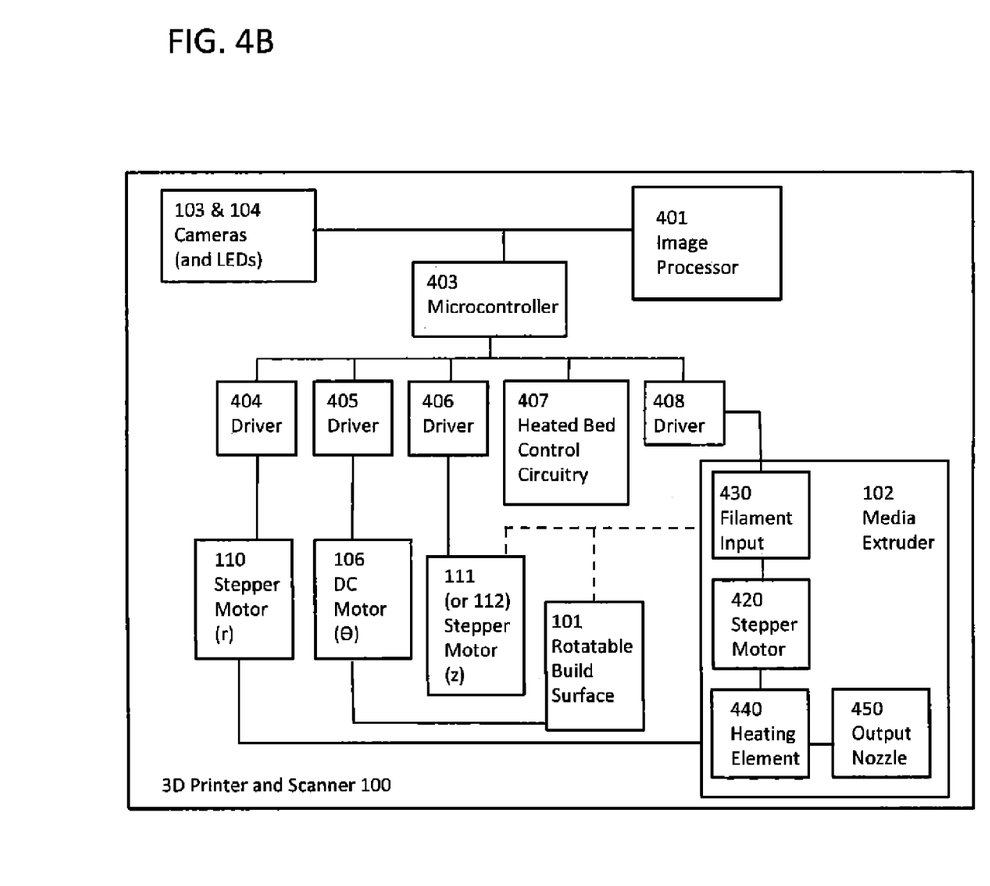
FIG. 4B illustrates a system block diagram for a 3D printer and scanner with an internal image processing device, according to one embodiment.

FIGS. 4A and 4B illustrate system block diagrams for a 3D printer and scanner, according to certain embodiments. As the systems are similar and include similar features, the figures are described together. For the sake of clarity and brevity, the common features will not be described in great detail repeatedly, but rather reference to the previous discussion is applicable.

The 3D printer and scanner 100 includes microcontroller 403. Microcontroller 403 communicably coupled to motor drivers (e.g., as described in further detail below) and peripherals (e.g., cameras, LEDs, keypad, touchscreen, safety switches, etc.). Microcontroller 403 communicates to supporting chips (e.g., the motor drivers) for control of various functions, such as all motion of the 3D printer and scanner. For instance, motor drivers may be controlled to provide the current required to drive the motors. For example, in one embodiment, microcontroller 403 actuates the motor 106 for rotational movement of the build surface 101, as well as any of the motors 110, 111, and 112 described above for movement along the r and z directions. The microcontroller 403 may also actuate the heating element in a coordinate fashion to create a 3D replica of the 3D object on the build surface. An example microcontroller 403 may include, but is not in any way limited to, an 8-bit microcontroller, ATmega2560, manufactured by Atmel Corporation.

In certain embodiments, such as shown in FIGS. 4A and 4B, the 3D printer and scanner 100 also includes motor drivers 404, 405, 406, and 408 that are communicably coupled to motors 110, 106, 111 (or 112), and 420, respectively. The motor drivers 404, 405, 406, and 408 are also communicably coupled to microcontroller 403. In this way, for example, microcontroller 403 controls motor drivers 404, 405, and 406 to provide control of the stepper motor 110 for r-direction movement, the DC motor 106 for rotational movement, and the stepper motor 111 (or stepper motor 112) for z-direction movement, respectively.

3D printer and scanner 100 is also shown in FIG. 4 to include heating bed with control circuitry 407 to control the heating of the heating bed—e.g., to ensure a filament material, such as acrylonitrile butadiene styrene (ABS) for instance, does remain stuck to the bed during the build process. For example, in one embodiment, the heated bed may heat to approximately 110 degrees Celsius. Other materials, such as polylactic acid (PLA), do not require the heating bed to remain hot to remain stuck to the heating bed.

The 3D printer and scanner 100 is also shown including a motor driver 408 communicably coupled to stepper motor 420 within media extruder 102. Microprocessor 403, motor driver 408 and stepper motor 420 provide control to provide filament to the media extruder 102. In some instances, one or more of motor drivers 404, 405, 406, and 408 may be included on a separate circuit board than microcontroller 403.

In the embodiment shown in FIG. 4A, the 3D printer and scanner 100 also includes a data transmission system 402 that is capable of being communicably coupled to the optical scanning system to send the plurality of 2D images to an external processor to convert the plurality of 2D images into a 3D surface reconstruction of the 3D object, and to receive from the processor 401, control code (e.g., G-Code) that is based on the 3D surface reconstruction. For example, in one embodiment, data transmission system 401 includes a transceiver 419 that is used to communicate via a wired or wireless technology (e.g., Universal Serial Bus (USB), USB, FireWire, SPI, SDIO, Ethernet, RS-232 port, or any other suitable electrical connector to enable data communication) to an processor 401—e.g., within remote data processing device 409 (e.g., a computer). The processor may be included within any variety of remote data processing devices, such as, but not limited to, a personal computer, server, laptop, PDA, cellular phone, smartphone, set-top box, etc. In one embodiment, the data transmission system 402 communicates with the processor 401 (e.g., computer 409) via the internet or other network.

In the embodiment shown in FIG. 4B, an image processor 401 is included in the 3D printer and scanner 100. As shown, the image processor 401 is communicably coupled to microcontroller 403. The plurality of 2D images from the cameras 103 and 104 are received by the image processor 401, which generates a 3D representation based on the 2D images. For example, processor 401 may generate control code (e.g., G-Code) to be used by microcontroller 403 to control the 3D printer and scanner 100 (e.g., movement in the r, θ, and z by motors 110, 106, 111 (or 112); as well as control of the motor 420).

For example, the control code provided by processor 401 in either FIG. 4A or 4B, may include instructions for a plurality of slices of the 3D object in the z-direction to enable the 3D objected to be replicated layer by layer from the bottom up. The instructions for the first layer are provided to microcontroller 403 to control the 3D printer and scanner to extrude filament at the appropriate locations on the build surface to produce the first slice of the 3D object. Again, the instructions include the movement in the r, θ, and z for the extruder 102 and build surface 101 to generate the first slice of the 3D object. Instructions for the next slice above the first slice is then executed by the 3D printer and scanner to extrude filament and produce the second slice of the 3D object, as similarly done for the first slice. This process continues up the replicated 3D object until the replica is complete.

The media extruder 102 may also include a filament input 430 for receiving a filament that is operably coupled to a motor 420 (e.g., stepper motor), which draws the filament into the extruder to the heating element 440 (e.g., heating chamber). The 3D printer and scanner system also include a heating element to melt the filament as it is drawn into the extruder. The stepper motor 420 and heating element 440 are located close to the exit of the extrusion nozzle 450.

In use, a 3D object is placed on the build surface 101 of the 3D printer and scanner 100. The optical scanning system including cameras 103 and 104 and lights (e.g., LEDs) which are used to obtain two-dimensional (2D) images of the 3D object. The LED's provide light that irradiates the 3D object and is reflected and detected by photodetectors (e.g., photodiodes or photomultipliers) of cameras 103 and 104 to provide image date representing a 2D image.

Furthermore, the rotational build surface 101 may be rotated via DC motor 106 to rotate the 3D object with respect to the cameras 103 and 104 while the cameras obtains additional 2D image data. The DC motor 106 may be controlled by microcontroller 403 and/or motor driver 405. Similarly, the cameras 103 and 104 and lights (e.g., LEDs) may be moved in the r-direction with respect to the 3D object via stepper motor 110. The stepper motor 110 is controlled by microcontroller 403 and/or motor driver 404. Similarly, cameras 103 and 104 and lights (e.g., LEDs) may be moved in the z-direction with respect to the 3D object via stepper motors 111 (or 112). The stepper motors 111 and 112 are controlled by microcontroller 403 and/or motor driver 406. The movement in the r, θ, and z directions may be controlled in conjunction to provide a plurality of 2D images around the 3D object and at different heights (e.g., height with respect to z-direction).

As stated previously, the plurality of 2D images from the cameras 103 and 104 are received by processor 401, which generates a 3D surface representation of the 3D object based on the plurality of 2D images. For example, processor 401 generates control code (e.g., G-Code) and communicates the control code to microcontroller 403 for control of the 3D printer and scanner 100 (e.g., movement in the r, θ, and z for the extruder 102 and build surface 101 by motors 110, 106, 111 (or 112); as well as control of the stepper motor 420). The control code includes, for example, instructions for the microcontroller 403 to enable the 3D printer and scanner 100 to generate a replica 3D object.

The control code includes, for example, instructions for controlling the movement of the media extruder 102 and build surface 101 in the r, θ, and z directions, in order to create a replica 3D object. For instance, the control code includes instructions for the rotating the build surface 101 at an angle, θ, via DC motor 106, to rotate the 3D object. The control code also includes instructions for moving the extruder 102 in the r-direction via stepper motor 110. Again, the instructions for moving the extruder 102 in the r-direction are provided in radial distances from the center of the axis of rotation, A, towards the outer perimeter of the build surface 101. In this way, the media extruder only moves in the r-direction and eliminates movement of the extruder in the y-direction. Furthermore, not requiring translation in the y-direction, may provide an additional benefit of reducing the footprint of the build area. For example, the 3D printer and scanners in the present disclosure do not require movement of the build surface in the y-direction, and thus require less space than systems that would require movement in the y-direction. For example, in one embodiment, the footprint of a 3D printer and scanner not having translation of the build surface in the y-direction, as described in the present disclosure, has a ratio of approximately 1:2, versus a traditional printer requiring translation of the build surface in the y-direction that would require a footprint of 1:4. The control code also includes instructions for moving the extruder 102 (or alternatively the build surface 101) in the z-direction via stepper motors 111 (or 112). Furthermore, the control code may also include instructions with respect to controlling providing filament via extruder 102. For instance, the instructions may include control code for controlling when to actuate the stepper motor 420 that draws the filament to the extruder 102. In this way, the control code may include instructions for controlling drivers 404, 405, 406, and/or 408.

Control code controls movement in the r, θ, and z directions to enable the replication of the 3D object. For example, the control code provided by processor 401 may include instructions for a plurality of slices of the 3D object in the z-direction to enable the 3D objected to be replicated layer by layer from the bottom up. The instructions for the first layer are provided to microcontroller 403 to control the 3D printer and scanner to extrude filament at the appropriate locations on the build surface to produce the first slice of the 3D object. Again, the instructions include the movement in the r, θ, and z for the extruder 102 and build surface 101 to generate the first slice of the 3D object. Instructions for the next slice above the first slice is then executed by the 3D printer and scanner to extrude filament and produce the second slice of the 3D object, as similarly done for the first slice. This process continues up the replicated 3D object until the replica is complete.

In one embodiment, such as shown in FIG. 4A, the processor 401 is located on a remote data processing device (e.g., computer 409). The plurality of 2D images are transmitted wired or wirelessly to the processor 401 (e.g., computer 409) via data transmission system 402 on the 3D printer and scanner. In some instances, the 2D images are transmitted to processor 401 via the internet. In another embodiment, such as shown in FIG. 4B, processor 401 is included within 3D printer and scanner 100.

It should be understood that the term processor is used broadly herein to refer to any processing chip or embedded processing cores. For example, the processor may include processors, microprocessor, digital signal processors (DSPs), and/or programmable circuitry programmed or configured by software and/or firmware, or special-purpose "hardwired" circuitry, or in a combination of such forms. Such programmable circuitry or special-purpose circuitry (if any) can be in the form of, for example, one or more application-specific integrated circuits (ASICS), programmable logic devices (PLDs), field-programmable gate arrays (FPGAs), etc. It should also be appreciated that such programmable circuitry or special-purpose circuitry may combine one or more functions or features described herein—e.g., functions provided by the processor and microcontroller, etc.

Additional Embodiments

In one embodiment, there is provided a 3D printing system configured to create a 3D replica of a 3D object on a build surface, with movements and/or controls based on polar coordinates relative to a center of a build surface. The printing system comprises: (a) a rotatable build surface; (b) a motor (e.g., DC motor) coupled to the build surface such that actuation of the motor rotates the build surface; and (c) an extruder positioned over the build surface. The extruder includes (1) a filament input for receiving a filament, (2) a motor (e.g., stepper motor) for drawing the filament into the extruder, (3) a heating element to melt the filament as it is drawn into the extruder, and (4) an output nozzle for depositing filament melt onto the build surface. The printing system further comprises: (d) an extruder positioning system coupled to the extruder and configured to move the extruder over the build surface based on polar coordinates relative to a center of the build surface. The extruder positioning system includes (1) a motor (e.g., stepper motor) for moving the extruder radially relative to the center of the build surface, and (2) a motor (e.g., stepper motor) for moving the extruder axially relative to the build surface. The printing system further comprises: (e) an optical scanning system comprising one or more cameras positioned to obtain a plurality of 2D images of a 3D object; and (g) a microcontroller coupled to the data transmission system and configured to execute the control code, wherein execution of the control code actuates the motors, and the heating element in a coordinate fashion to create a 3D replica of the 3D object on the build surface. The optical scanning system may include means for moving the one or more cameras axially or radially with respect to the build surface in order to obtain multiple images of the 3D object. The means for moving the one or more cameras may incorporate the use of the motor (e.g., stepper motor) for moving the extruder radially relative to the center of the build surface, and motor (e.g., stepper motor) for moving the extruder axially relative to the build surface. At least one camera may be coupled to the extruder such that movement of the extruder results in movement of the camera. For example, the camera may be vertically oriented to move relatively above the build surface. It should be appreciated that various types of motors may be implemented for any of the described motors in different embodiments. For example, in one embodiment, the DC motor rotates the build surface while the other motors are stepper motors.

In certain embodiments, the system components include an image processor communicably coupled to the microcontroller, wherein the image processor receives the plurality of 2D images, converts the plurality of 2D images into a 3D surface reconstruction of the 3D object, and generates control code based on the 3D surface reconstruction. In other embodiments, the system components may include a data transmission system coupled to the optical scanning device and configured with the ability to send the plurality of 2D images to an external processor to convert the plurality of 2D images into a 3D surface reconstruction of the 3D object, and receive control code from the external processor, wherein the control code is based on the 3D surface reconstruction;

In another embodiment, there is provided a 3D printing system based on polar coordinates, comprising: (a) a build surface; (b) an extruder positioned over the build surface for depositing filament melt onto the build surface; (c) an extruder positioning system coupled to the extruder and configured to move the extruder over the build surface based on polar coordinates relative to a center of the build surface serving as a center of origin; and (d) a microcontroller coupled to the extruder positioning system and configured to execute a control code, wherein execution of the control code actuates the extruder positioning system to move the extruder in axial and radial directions relative to the center of the build surface. The radial movement is measure from the center of the axis of rotation, A, towards the outer perimeter of the build surface. Furthermore, the extruder can move completely across the entire diameter of the build surface. The system may further comprise: (e) a motor coupled to the build surface such that actuation of the motor rotates the build surface. Rotation of the build surface can be clockwise, counter-clockwise, one-directional, bi-directional, etc. The system may further comprise: (f) a motor couple to the build surface and configured to control the rotational position of the build surface. The extruder may further comprise: (1) a filament (or pellet, or media) input for receiving a filament (or pellet, or media); (2) a motor for drawing the filament into the extruder; (3) a heating element to melt the filament as it is drawn into the extruder; and (4) an output nozzle for depositing the filament melt onto the build surface. The extruder positioning system may further comprise: (1) a motor for moving the extruder radially (in positive or negative radius); and (2) a motor for moving the extruder axially. The extruder may move in either direction away from the axis of rotation, and the distance, r, is measured from the axis of rotation for instance.

The system may further comprise: (g) a scanning device positioned to obtain a plurality of 2D images of a 3D object; and (h) a data transmission system coupled to the scanning device and configured to send the plurality of 2D images to an external processor, and receive control code from the external processor. The control code may include commands for controlling the filament melt being processed by the extruder. The control code may include commands for controlling the radial position of the extruder relative to the center of the build surface. The control code may include commands for controlling the axial position of the extruder relative to the build surface. The plurality of images may be obtained by the scanning device while the 3D object is rotated on the build surface. The scanning device may include a charge-coupled device (CCD) image sensor and/or a complementary metal-oxide semiconductor (CMOS) image sensor.

In another embodiment, there is provide a 3D printing system, comprising: (a) a build surface; (b) an extruder positioned over the build surface for depositing media melt onto the build surface; and (c) means for controlling the position of the extruder, relative to the build surface, based on polar coordinates. The means for controlling the position of the extruder may further comprise: (1) a motor coupled to the extruder to move the extruder radially relative to a center of the build surface; (2) a motor coupled to the extruder to move the extruder axially relative to the build surface; (3) a motor coupled to the build surface to move the build surface axially relative to the extruder; and/or (4) a microcontroller configured to execute a control code, wherein execution of the control code moves the extruder in axial and radial directions relative to a center of the build surface. The extruder may further comprise: (1) a media input for receiving media; (2) a stepper motor for drawing the media into the extruder; (3) a heating element to melt the media as it is drawn into the extruder; and (4) an output nozzle for depositing the media melt onto the build surface.

The system may further comprise: (d) a motor coupled to the build surface, wherein actuation of the motor rotates the build surface; (e) a scanning device positioned to obtain a plurality of 2D images of a 3D object; and/or (f) a data transmission system coupled to the scanning device and configured to send the plurality of 2D images to an external processor, and receive control code from the external processor. The control code may include commands for controlling the filament melt being processed by the extruder, commands for controlling the radial position of the extruder relative to a center of the build surface, and/or commands for controlling the axial position of the extruder relative to the build surface. The plurality of images may be obtained by the scanning device while the 3D object is rotated on the build surface.

The extruder may include: (g) a heating element and/or (h) a temperature sensor. The temperature of the extruder may serve as a data input to a stepper motor for drawing the media into the extruder. For example, depending on the speed of the filament being processed through the extruder, current being delivered to the extruder's heating element may be adjusted to control the temperature of the extruder (and thus the melt) so as to provide the appropriate (i.e., desired) temperature to melt the filament. A microcontroller may use proportional integral derivative (PID) algorithms to sample temperature changes and counter-act current flow to adjust the temperature accordingly. In other words, a closed-loop feedback controller may be used to gradually control the temperature of the extruder.

In still another embodiment, there is provided a 3D printing and scanning device, comprising: (a) a rotatable build surface; (b) an extruder positioned over the build surface, wherein the extruder includes (1) a filament input device for receiving a filament, (2) a heating element to melt the filament as it is drawn into the extruder, and (3) an output nozzle for depositing filament melt onto the build surface; (c) an extruder positioning system coupled to the extruder and configured to move the extruder radially and axially over the build surface; (d) an imaging device positioned to obtain a plurality of 2D images of a 3D object; and (e) a processor. The device may further comprise: (f) a computer readable storage medium having instructions, executable by the processor, which when executed cause the processor to (1) convert the plurality of 2D images into a 3D surface reconstruction model, (2) convert the 3D surface reconstruction model into control code, and (3) execute the control code so as to control the extruder positioning system and create a 3D replica of the 3D object on the build surface with coordinated radial and axial movements over the build surface.

In yet another embodiment, there is provided a 3D printing and scanning method based on polar coordinates. The method comprises: (a) positioning an extruder over a rotatable build surface; (b) configuring an extruder positioning system to move the extruder radially and axially relative to the build surface; and (c) executing a control code, with a microcontroller coupled to the extruder positioning system, in order to fabricate a 3D object.

In another embodiment, there is provided a 3D printing and scanning method comprising: (a) obtaining a plurality of 2D images of a 3D object with the scanning device; (b) creating a 3D computer-aided design (CAD) model of the 3D object; (c) creating control code based on the 3D CAD model; and (d) executing the control code so as to perform coordinated radial and axial movements of an extruder, which is positioned over a rotatable build surface, to fabricate a 3D replica of the 3D object.

In still another embodiment, there is provided a 3D printing and scanning method, comprising: (a) obtaining a plurality of 2D images of a 3D object with the scanning device; (b) transmitting the plurality of 2D images to a processor to create a 3D computer-aided design (CAD) model of the 3D object; (c) receiving control code from the processor, wherein the control code is based on the 3D CAD model of the 3D object; and (d) executing the control code so as to perform coordinated radial and axial movements of an extruder, which is positioned over a rotatable build surface, to fabricate a 3D replica of the 3D object.

In another embodiment, there is provided a 3D printing and scanning method based on polar coordinates. The method comprises: (a) receiving control code from the processor, wherein the control code is based on a 3D computer-aided design (CAD) model of a 3D object; and (b) executing the control code so as to perform coordinated radial and axial movements of an extruder, which is positioned over a rotatable build surface, to fabricate a 3D replica of the 3D object.

In still another embodiment, there is provided a 3D printing and scanning method based on polar coordinates. The method comprises: (a) receiving a control code from a processor, wherein the control code is based on a 3D computer-aided design (CAD) model; and (b) executing the control code so as to perform coordinated radial movements of an extruder, which is positioned over a rotatable build surface, to fabricate a 3D object.

In yet another embodiment, there is provided a 3D printing and scanning method, comprising: (a) receiving a plurality of 2D images of a 3D object from an optical scanning device; (b) creating a 3D surface reconstruction model of the 3D object; (c) converting the 3D surface reconstruction into control code to perform coordinated radial and axial movements of an extruder, which is positioned over a rotatable build surface, to fabricate a 3D replica of the 3D object using polar coordinate movements; and (d) delivering the control code to a remote 3D printer and scanner.

Communication between Parties

In one embodiment, communication between the various parties and components of the present invention is accomplished over a network consisting of electronic devices connected either physically or wirelessly, wherein digital information is transmitted from one device to another. Such devices (e.g., end-user devices and/or servers) may include, but are not limited to: a desktop computer, a laptop computer, a handheld device or PDA, a cellular telephone, a set top box, an Internet appliance, an Internet TV system, a mobile device or tablet, or systems equivalent thereto. Exemplary networks include a Local Area Network, a Wide Area Network, an organizational intranet, the Internet, or networks equivalent thereto.

Computer Implementation

Figure 5:
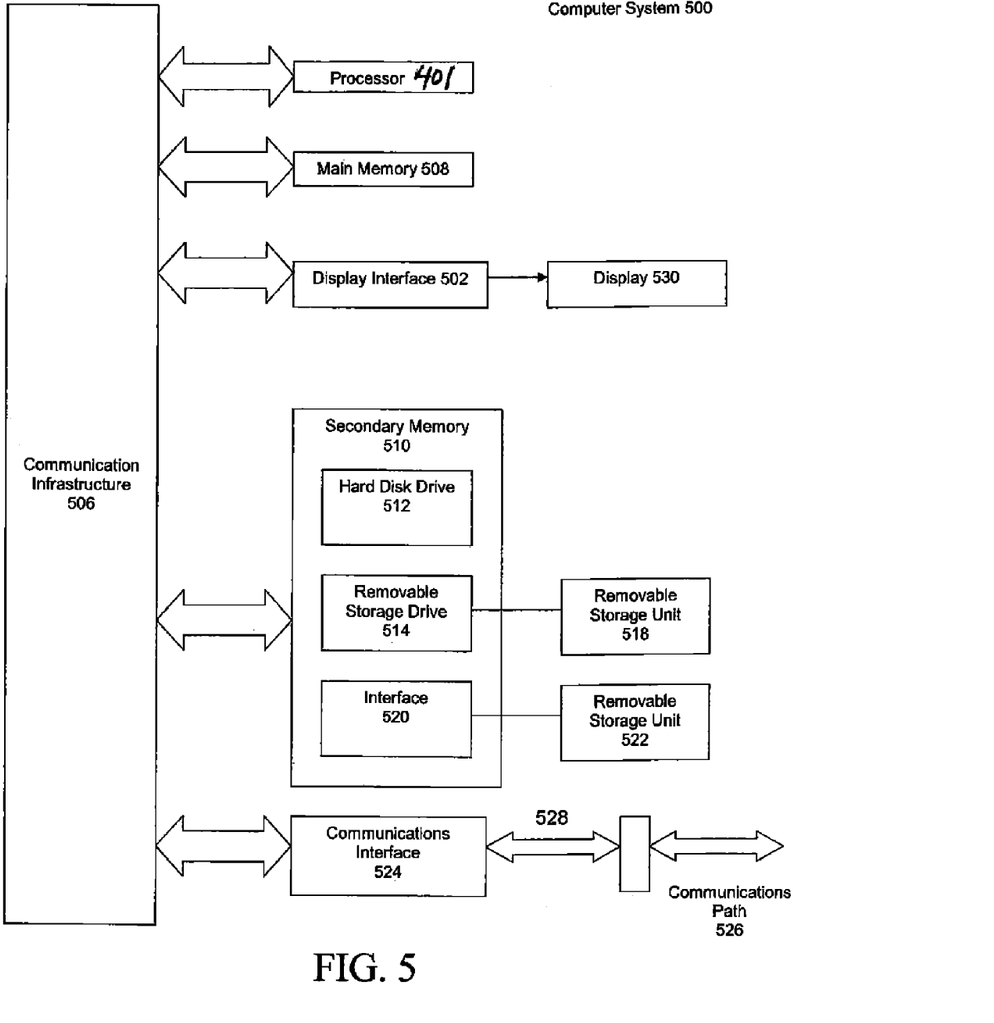
FIG. 5 illustrates a schematic drawing of an example computing system.

In some aspects, the invention is directed toward one or more computer systems capable of carrying out the functionality described herein. FIG. 5 illustrates a schematic drawing of a computer system 500 used to implement the methods presented above. Computer system 500 includes one or more processors, such as processor 401. The processor 401 is connected to a communication infrastructure 506 (e.g., a communications bus, cross-over bar, or network). Computer system 500 can include a display interface 502 that forwards graphics, text, and other data from the communication infrastructure 506 (or from a frame buffer not shown) for display on a local or remote display unit 530.

Computer system 500 also includes a main memory 508, such as random access memory (RAM), and may also include a secondary memory 510. The secondary memory 510 may include, for example, a hard disk drive 512 and/or a removable storage drive 514, representing a floppy disk drive, a magnetic tape drive, an optical disk drive, flash memory device, etc. The removable storage drive 514 reads from and/or writes to a removable storage unit 518. Removable storage unit 518 represents a floppy disk, magnetic tape, optical disk, flash memory device, etc., which is read by and written to by removable storage drive 514. As will be appreciated, the removable storage unit 518 includes a computer usable storage medium having stored therein computer software, instructions, and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow computer software, instructions, and/or data to be transferred from the removable storage unit 522 to computer system 500.

Computer system 500 may also include a communications interface 524. Communications interface 524 allows computer software, instructions, and/or data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to non-transient media, such as removable storage drive 514, removable storage units 518, 522, and/or a hard disk installed in hard disk drive 512. These computer program products provide computer software, instructions, and/or data to computer system 500. These computer program products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 401 to perform the features of the presented methods. Accordingly, such computer programs represent controllers of the computer system 500. Where appropriate, the processor 401, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into computer system 500 using removable storage drive 514, interface 520, hard drive 512, communications interface 524, or equivalents thereof. The control logic (software), when executed by the processor 401, causes the processor 401 to perform the functions and methods described herein.

In another embodiment, the methods are implemented primarily in hardware using, for example, hardware components such as ASICs or FPGAs. Implementation of the hardware state machine so as to perform the functions and methods described herein will be apparent to persons skilled in the relevant art(s). In yet another embodiment, the methods are implemented using a combination of both hardware and software.

Embodiments of the invention, including any systems and methods described herein, may also be implemented as instructions stored on a non-transient machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

Conclusion

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible. Further, each system component and/or method step presented should be considered a "means for" or "step for" performing the function described for said system component and/or method step. As such, any claim language directed to a "means for" or "step for" performing a recited function refers to the system component and/or method step in the specification that performs the recited function, as well as equivalents thereof.

Use of the term "may" (e.g., "may," "may be," "may have") within this description generally indicates that the described operation, structure, or other innovative element described is present in one or more embodiments of the invention, but is not necessarily present in all embodiments. Therefore, the term "may" is not indefinite herein, but indicates a condition relevant to at least a subset of the possible embodiments according to the applicants' contemplation of the invention.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A three-dimensional (3D) printing and scanning system configured to create a 3D replica of a 3D object on a build surface, with movements and/or controls based on polar coordinates relative to a center of a build surface, comprising:
    an uninterrupted circular planar build surface which is rotatable about a central axis of rotation;
    a first motor coupled to the build surface such that actuation of the first motor rotates the build surface;
    an extruder positioned over the build surface, wherein the extruder includes
        a filament input for receiving a filament,
        a second motor for drawing the filament into the extruder,
        a heating element to melt the filament as it is drawn into the extruder, and
        an output nozzle for depositing filament melt onto the build surface;
    an extruder positioning system coupled to the extruder and configured to move the extruder over the build surface based on polar coordinates relative to a center of the build surface, wherein the extruder positioning system includes:
        a third motor for moving the extruder radially relative to the center of the build surface, and
        a fourth motor for moving the extruder axially relative to the build surface;
    an optical scanning system comprising one or more cameras positioned to obtain a plurality of two-dimensional (2D) images of a 3D object; and
    a microcontroller coupled to a data transmission system and configured to execute control code, wherein execution of the control code actuates the first motor, the second motor, the third motor, the fourth motor, and the heating element in a coordinate fashion to create a 3D replica of the 3D object on the build surface.

2. The printing and scanning system of claim 1, wherein the optical scanning system includes a moving element for moving the one or more cameras axially or radially with respect to the build surface in order to obtain multiple images of the 3D object.

3. The printing and scanning system of claim 2, wherein the moving element for moving the one or more cameras incorporates the use of the third and fourth motors.

4. The printing and scanning system of claim 1, wherein at least one of the one or more cameras is coupled to the extruder such that movement of the extruder results in movement of the camera.

5. The printing and scanning system of claim 1, wherein the data transmission system is coupled to the optical scanning device and configured to send the plurality of 2D images to an external processor to convert the plurality of 2D images into a 3D surface reconstruction of the 3D object, and receive control code from the external processor, wherein the control code is based on the 3D surface reconstruction.

6. The printing and scanning system of claim 1, further comprising:
    an image processor communicably coupled to the microcontroller, wherein the image processor receives the plurality of 2D images, converts the plurality of 2D images into a 3D surface reconstruction of the 3D object, and generates control code based on the 3D surface reconstruction.

7. The printing and scanning system of claim 1, wherein the first motor is a DC motor, and the second, third, and fourth motors are stepper motors.

8. A three-dimensional (3D) printing and scanning system based on polar coordinates, comprising:
    an uninterrupted circular planar build surface which is rotatable about a central axis of rotation;
    an extruder positioned over the build surface for depositing filament melt onto the build surface;
    an extruder positioning system coupled to the extruder and configured to move the extruder over the build surface based on polar coordinates relative to a center of the build surface serving as a center of origin;
    an optical scanning system comprising one or more cameras positioned to obtain a plurality of two-dimensional (2D) images of a 3D object; and
    a microcontroller coupled to the extruder positioning system and configured to execute a control code, wherein execution of the control code actuates the extruder positioning system to move the extruder in axial and radial directions relative to the center of the build surface.

9. The system of claim 8, further comprising:
    a first motor coupled to the build surface such that actuation of the motor rotates the build surface.

10. The system of claim 9, wherein rotation of the build surface is one-directional.

11. The system of claim 9, wherein the build surface is configured to rotate about the central axis of rotation in a first direction and non-simultaneously, in a second direction.

12. The system of claim 8, wherein the extruder further comprises:

a filament input for receiving a filament;
a first motor for drawing the filament into the extruder;
a heating element to melt the filament as it is drawn into the extruder; and
an output nozzle for depositing the filament melt onto the build surface.

13. The system of claim 8, wherein the extruder positioning system further comprises:
a first motor for moving the extruder radially; and
a second motor for moving the extruder axially.

14. The system of claim 8, further comprising:
a scanning device positioned to obtain a plurality of two-dimensional (2D) images of a 3D object; and
a data transmission system coupled to the scanning device and configured to send the plurality of 2D images to an external processor, and receive control code from the external processor.

15. The system of claim 14, wherein the control code includes commands for controlling the filament melt being processed by the extruder.

16. The system of claim 14, wherein the control code includes commands for controlling the radial position of the extruder relative to the center of the build surface.

17. The system of claim 14, wherein the control code includes commands for controlling the axial position of the extruder relative to the build surface.

18. The system of claim 14, wherein the plurality of images are obtained by the scanning device while the 3D object is rotated on the build surface.

19. A three-dimensional (3D) printing and scanning system, comprising:
an uninterrupted circular planar build surface which is rotatable about a central axis of rotation;
an extruder positioned over the build surface for depositing media melt onto the build surface;
an optical scanning system comprising one or more cameras positioned to obtain a plurality of two-dimensional (2D) images of a 3D object; and
a positioning element for controlling the position of the extruder, relative to the build surface, based on polar coordinates; wherein the positioning element for controlling the position of the extruder further comprises a motor coupled to the extruder to move the extruder radially relative to a center of the build surface.

20. The system of claim 19, wherein the extruder further comprises:
a media input for receiving media;
a motor for drawing the media into the extruder;
a heating element to melt the media as it is drawn into the extruder; and
an output nozzle for depositing the media melt onto the build surface.

21. The system of claim 19, further comprising:
a first motor coupled to the build surface and configured to control a rotational position of the build surface.

* * * * *